United States Patent [19]

Levesque, Jr.

[11] 4,139,887
[45] Feb. 13, 1979

[54] DYNAMIC COMPENSATION FOR MULTI-LOOP CONTROLS

[75] Inventor: Adelard Levesque, Jr., North Palm Beach, Fla.

[73] Assignee: United Technologies Corporation, Hartford, Conn.

[21] Appl. No.: 792,091

[22] Filed: Apr. 28, 1977

[51] Int. Cl.² ............................ G06G 7/66; F02C 9/02
[52] U.S. Cl. ........................................ 364/105; 60/242; 318/609; 364/110; 364/431; 415/17
[58] Field of Search ................. 318/639, 609; 415/17; 60/242; 364/105, 110, 431

[56] References Cited

U.S. PATENT DOCUMENTS

| | | |
|---|---|---|
| 3,758,764 | 9/1973 | Harner .............................. 369/431 |
| 3,790,765 | 2/1974 | Morrison .......................... 235/150.1 |
| 3,854,287 | 12/1974 | Rembold .................................. 60/242 |
| 3,916,170 | 10/1975 | Norimatsu et al. ............ 235/150.21 |
| 3,939,328 | 2/1976 | Davis .................................... 364/105 |
| 4,042,809 | 8/1977 | Shetler .................................. 364/110 |

Primary Examiner—Felix D. Gruber
Attorney, Agent, or Firm—Norman Friedland

[57] ABSTRACT

An integral plus proportional control system responding to more than one variable controls a single actuator wherein the integral gain is selected in accordance with the error of that variable which is being controlled to compensate for varying process dynamics. An error selector serves to discriminate the error signal which is being controlled and synchronously selects the gain of the integrator.

4 Claims, 2 Drawing Figures

DYNAMIC COMPENSATION FOR MULTI-LOOP CONTROLS

BACKGROUND OF THE INVENTION

This invention relates to a control system of the proportional plus integral type and particularly to a system wherein a single actuator serves to control power plant variables where the control responds to more than one parameter and the gain of the integrator is selected as a function of the error of the variable being controlled.

As is well known it is abundantly important that the gain of a control system is designed to match the response time of the system it is controlling. This is to assure quick response and stability in both the control and the system being controlled. Proportional plus integral types of controls are well known in the art and are utilized to optimize quick response and stable operation of the control dynamics by matching the gains to compensate for time lags and leads relative to the process dynamics. If the type of control responds to a single input and employs a single actuator, the dynamics of the system is relatively simple and stability and quick response are easily achieved by designing the system with the proper compensating time constants. However, a mismatch of response time in the process dynamics is apt to be present when a single actuator is controlled by more than one variable. For example, if the exhaust nozzle ($A_j$) actuator for a gas turbine engine is controlled by an engine pressure ratio variable and an engine air flow variable, because of the time difference it requires for each variable to be affected by a change in area, it is necessary to design the control to compensate for this difference. Of course the design of multi-loop control system can be compromised but this is not ideal inasmuch as either speed and stability are compromised.

I have found that I can obviate this problem by designing the proportional plus integral control by changing the integral gain depending on which variable is controlling. Thus, this control scheme which included a single actuator being controlled by more than one variable has been engine tested and has proven to be particularly efficacious.

SUMMARY OF THE INVENTION

An object of this invention is to provide an improved multi-loop control system having a single actuator controlled by two or more variables.

A still further object of the invention is to provide means to compensate for varying process dynamics in a multi-loop control where one actuator is controlled by at least two variables, by changing the integral gain as a function of the error of that variable controlling the actuator.

Other features and advantages will be apparent from the specification and claims and from the accompanying drawings which illustrate an embodiment of the invention.

DESCRIPTION OF THE PREFERRED EMBODIMENT

Figure 1:
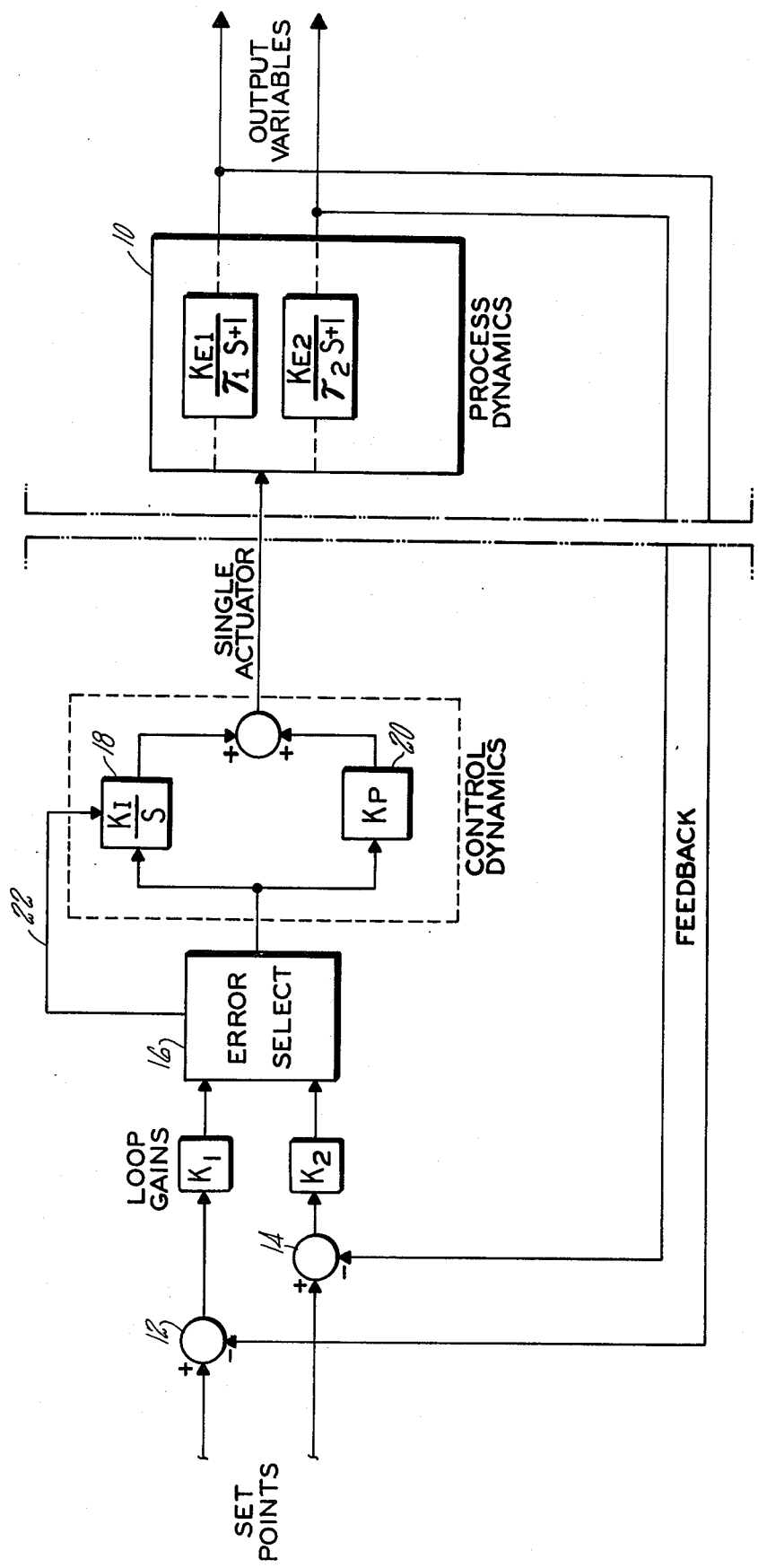
FIG. 1 is a block diagram illustrating the dynamics of a multi-loop control system controlling a single actuator in response to two variables.

As shown in FIG. 1 a single actuator which can take the form of any well known servo mechanism, say for example the fuel metering mechanism or the exhaust nozzle actuator, each being well known and commercially available, for controlling either the fuel flow to the engine or the area of the exhaust nozzle of the engine. Actuators, valve mechanisms and engines of the type contemplated that can be employed with this invention are for example the F-100, JT-9 and JT-8 engines, JFC-25 and JFC-68 fuel controls manufactured by the Pratt and Whitney and Hamilton Standard divisions of United Technologies Corporation, the assignee and to which reference should be made.

The variable for example may be $N_1$ (compressor rotor speed) and TIT (turbine inlet temperature) sensed on the engine represented by block 10. $N_1$ being compared with a scheduled value at comparator 12 and TIT being compared with a scheduled value at comparator 14. The error from each would then be processed by first adding a proportional gain prior to selecting which of the errors that would control the actuator. The output from suitable error selector 16 would then be applied to the proportional plus integral control for adjusting the actuator, which in turn adjusts fuel flow to provide the energy to the engine to achieve the correct $N_1$ or TIT.

According to the invention the integral gain of the integrator represented by block 18 would be selected depending on what error is controlling, namely, TIT or $N_1$. The gain of proportional control represented by block 20 remains fixed at a preselected value.

The control dynamics may be expressed in the following manner $$K_I(K_p/K_I S+1)/S$$

For loop 1 $K_p/K_I = \tau 1$
For loop 2 $K_p/K_I = \tau 2$
where:
$K$ = gain
$\tau_1, \tau_2$ = compensating time constants
$S$ = La Place transform operator
subscript I = integrator
subscript P = proportional Hence for constant $K_p$, $K_I$ is varied as shown by line 22 to exactly compensate either of the process dynamics. The loop gains $K_1$ and $K_2$ can then be adjusted for the proper, overall gain. Changing the integral gain did not cause a step change in outputs and hence results in smooth control action.

Figure 2:
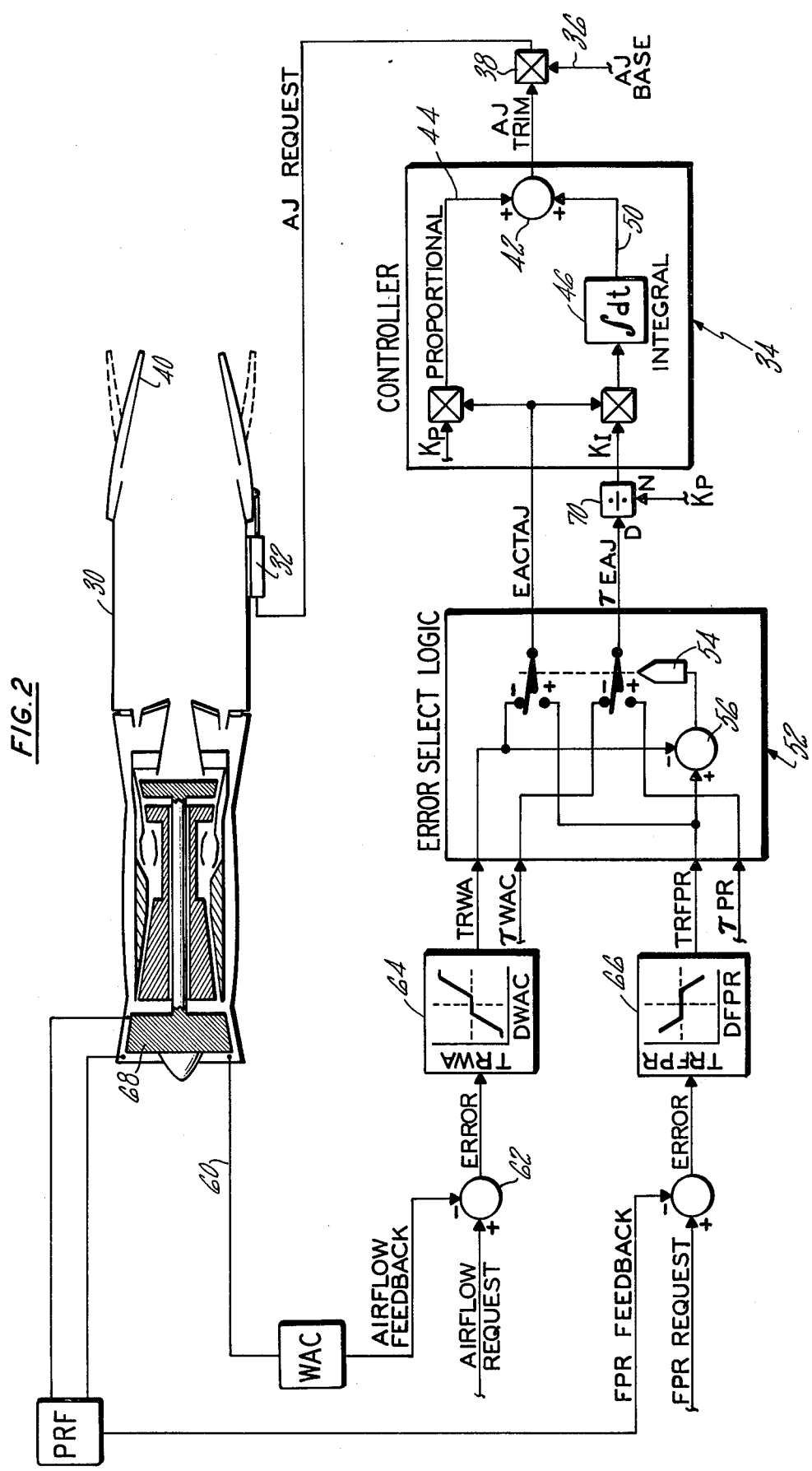
FIG. 2 is a schematic diagram illustrating the invention in its preferred embodiment controlling two variables of a gas turbine engine.

FIG. 2 shows another preferred embodiment in more detail for a gas turbine engine 30 where the exhaust nozzle $A_j$ is adjusted by actuator 32 responding to the proportional plus integral controller 34. Although shown in analogue form as one skilled in the art can appreciate, this invention can be easily adapted for digital control. In this instance the output of controller 34 is a value that serves to trim the exhaust area control signal generated by a suitable control (not shown) represented by line 36. Multiplier 38 adds the effect of the $A_j$ trim value to the base value to readjust the area of the nozzle 40.

Looking at the proportional plus integral controller 34 the proportional portion is applied to junction 42 via line 44 and the integral portion obtained from a suitable integrator 46 is applied to junction 42 via line 50.

The input EACTAJ to controller 34 is selected by the error select logic 52 which may be a suitable relay switch 54 and comparator 56. The compensation time constant $\tau$ EAJ is fed into the integral loops to change its gain and as will be discussed hereinbelow the integral gain will be selected as a function of which error is controlling.

As is apparent from FIG. 2, the negative terminals are in contact with the EACTAJ error loop and the $\tau$EAJ gain loop. This error signal is generated as a difference between requested airflow and actual airflow sensed in line 60 and fed to summer 62, which produces an error output signal fed to the gain generator 64 which generates the air weight flow signal (TRWA) as a function of delta WAC (DWAC). A dead band is built into the gain generator to reduce duty cycle of the controller as is well known. Gain generator 66 serves to generate the fan pressure ratio error signal (TRFPR) which is obtained similarly to the manner in which the TRWA error signal was obtained by sensing the pressures across fan 68 and computing their ratio. Likewise, this signal is compared with the requested pressure ratio (FPR) to produce the error. Since TRWA is greater than TRFPR switch 54 connects the negative terminals as shown and EACTAJ equals TRWA and $\tau$ WAC (a predetermined gain) equals $\tau$ EAJ so that the exhaust nozzle area will control WAC.

On the other hand if TRFPR becomes greater than TRWA the positive terminals will be connected and EACTAJ equals TRFPR and $\tau$ EAJ equals $\tau$ PR (another predetermined gain). In this instance fan pressure ratio will be controlled by the exhause nozzle.

As is apparent from the foregoing the gain of the integral loop will be selected as a function of the error signal driving controller 34.

The $K_p/K_I$ gain relationship can be preselected by incorporating divider 70 which divides a constant fed to the proportional control by a preselected value. Also, the time constant ($\tau$) can be made to vary as a function of an engine operating condition which will have the effect of making the compensation adjust itself to match the engine dynamics.

It should be understood that the invention is not limited to the particular embodiments shown and described herein, but that various changes and modifications may be made without departing from the spirit or scope of this novel concept as defined by the following claims.

I claim:

1. A proportional-integral type control system having a controller for a single actuator responding to at least two distinct measured variables having unique, but different time responses, means for generating the error of each of said variables from a given norm, means selecting one of said errors, said controller responsive to said selective error to control said actuator to take corrective action to correct for said error for nulling said selected error, means for synchronously adjusting the gain in the forward loop of said integral portion of said proportional-integral control so that said gain matches the response time of said variable for which the error is being nulled.

2. A system as in claim 1 including a switching circuit having means for connecting the error of one of said variables and its associated gain, and a comparator for comparing each of said error signals and controlling said switching circuit in response to the larger of said error signals.

3. In a multi-loop control system having a proportional-integral type control and a single actuator responding to at least two distinct variables having unique, but different time responses, means responsive to a variable and a given norm for establishing an error signal for each of said variables, means responsive to each of said error signals for selecting an error manifested from either of each of said variables, said proportional-integral type control responsive to selected error for controlling said actuator for taking corrective action to correct for said error and nulling said selected error, means in the forward loop for synchronously adjusting the gain of said integral portion of said proportional-integral control so that said gain matches the response time of said variable for which the error is being nulled.

4. In a multi-loop control system as in claim 3 including means for establishing a predetermined gain for each of the error signals of each of said variables, switching means responsive to the error of said variable being in the control mode for connecting said predetermined gain established for said selected variable with the integrator of said proportional-integral control.

* * * * *